Oct. 25, 1932.  J. DE LA CIERVA  1,884,596
AIRCRAFT AND METHOD OF OPERATING THE SAME
Filed Dec. 20, 1929  2 Sheets-Sheet 1
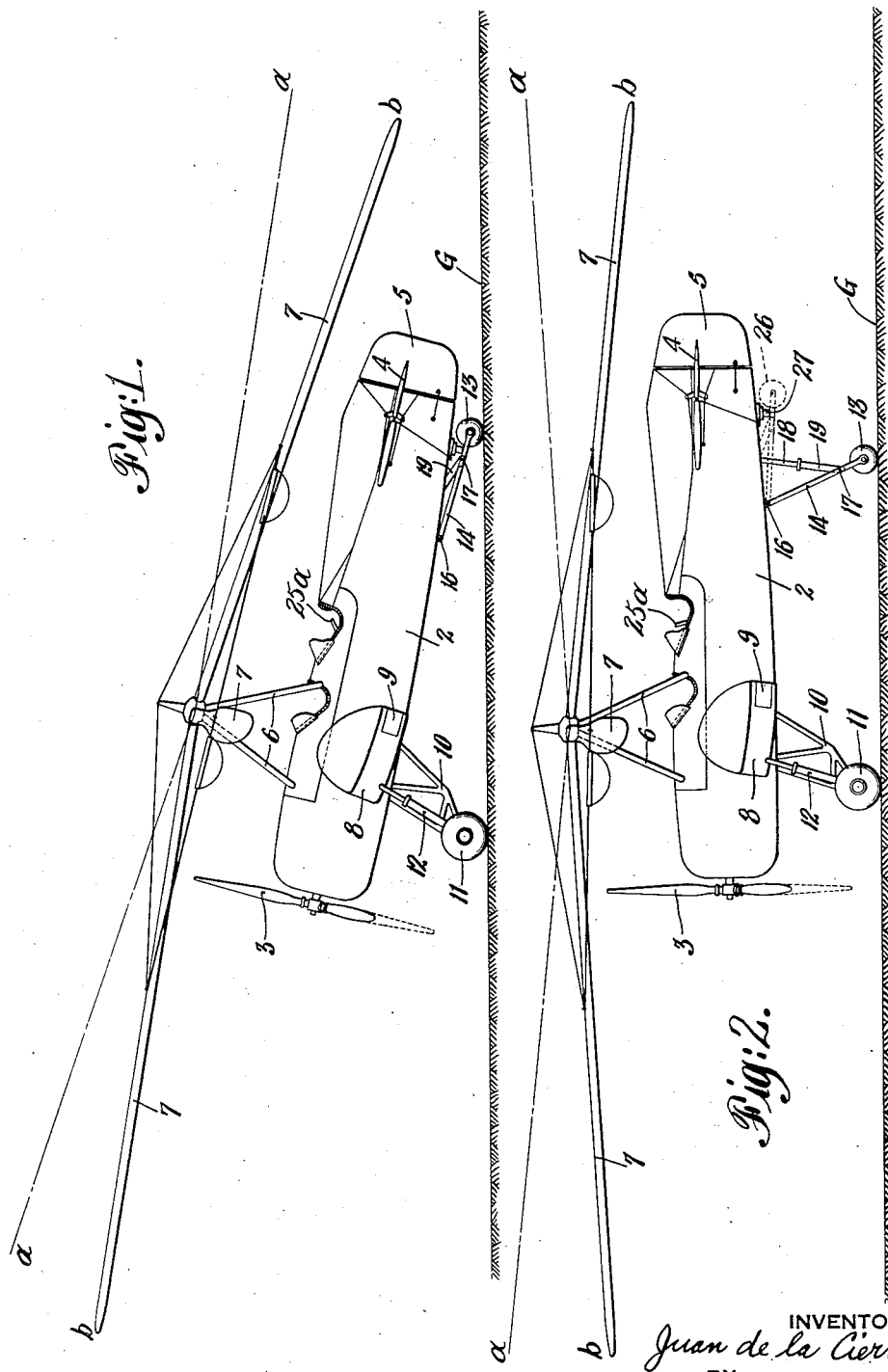
INVENTOR
Juan de la Cierva
BY
Symmestvedt + Lechner
ATTORNEYS

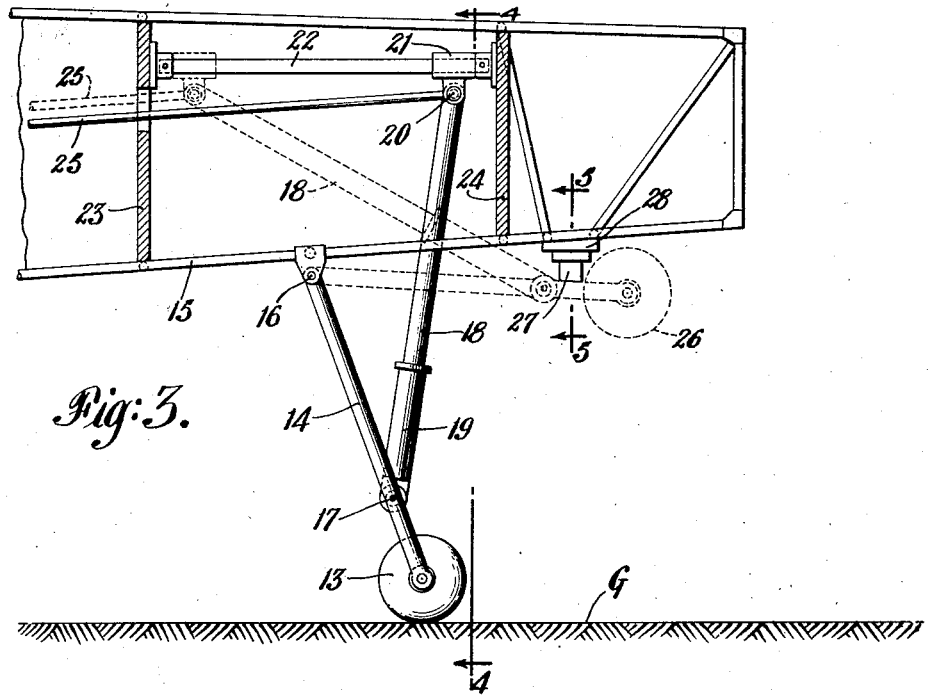

Patented Oct. 25, 1932

1,884,596

UNITED STATES PATENT OFFICE

JUAN DE LA CIERVA, OF MADRID, SPAIN, ASSIGNOR TO AUTOGIRO COMPANY OF AMERICA, OF PHILADELPHIA, PENNSYLVANIA, A CORPORATION OF DELAWARE

AIRCRAFT AND METHOD OF OPERATING THE SAME

Application filed December 20, 1929. Serial No. 415,387.

This invention relates to aircraft and method of operating the same and is especially concerned with the general type of aircraft which includes a movable sustaining wing system such, for example, as a plurality of sustaining blades mounted to rotate about a common axis and actuable by the relative air-flow in flight.

The present invention has two primary objects in view, the first of which is the facilitation of the initial starting of the sustaining blades prior to taking off from the ground. The second of these objects will appear more clearly from a consideration of the following remarks.

In common types of airplanes having the usual rigid and non-movable supporting or sustaining wings, the lift exerted by the wings decreases very quickly and substantially as the angle of incidence thereof increases, positively, beyond approximately 16° which is the usual upper limit for normal flying of aircraft of the rigid wing type. On the other hand, the lift exerted by a rotatably mounted wing system does not decrease materially out of proportion to the increase in the angle of incidence of the general plane of rotation of the sustaining blades, until the angle approaches approximately 50° from the horizontal. In other words, with the fixed-wing type of aircraft the lift decreases much more rapidly than, and out of proportion to, increases in the positive angle of incidence, while, with the type of aircraft having rotatably mounted wings, the lift does not sharply fall off until positive angles of 50° or more are reached.

Most types of aircraft, furthermore, are provided with supporting means, usually including an undercarriage located at the forward end of the fuselage and a tail support or skid at the rear end, which are relatively arranged and proportioned to support the aircraft on the ground at a considerable inclination with respect thereto.

However, it is desirable, at least under certain circumstances, that aircraft of the rotative wing-type be capable of support on the ground in such position that the general plane in which the supporting blades or wings revolve (i. e., a plane perpendicular to the axis of the rotative system) is parallel or nearly parallel to the ground. For example, when making a perpendicular or a relatively steep landing, in a substantial wind, if the tail or rear end of the fuselage were permitted to drop sufficiently to materially increase the angle of incidence of the plane perpendicular to the axis of the rotor, the relative airflow created by the wind might be sufficient to lift the machine from the ground again, particularly in view of the fact that the lift exerted by the sustaining blades would not be materially decreased, even at considerable positive angles.

In order to positively avoid encountering difficulties of this nature, the present invention contemplates the provision of means for supporting the aircraft on the ground in such position that the rotor axis closely approximates a perpendicular position with respect to the ground.

At the same time, however, the present invention involves a method of starting such that it is desirable that the aircraft should be capable of support on the ground at a substantial inclination with respect thereto.

To this end, I have provided the adjustable supporting mechanism described herebelow.

How the foregoing, together with other objects and advantages are obtained, will be apparent from the consideration of the following description taken with the accompanying drawings which illustrate the preferred embodiment of the invention, and in which, Fig. 1 is a side view of an aircraft of the rotative wing-type to which the improvements of the present invention have been applied and with which the method of the present invention may be practiced, the view being taken of the aircraft resting on the ground at a substantial inclination with respect thereto;

Fig. 2 is a view similar to Fig. 1 but illustrating the aircraft resting on the ground in such position that the rotor axis approximates perpendicularity with respect thereto;

Fig. 3 is a side view of a portion of the rear end of the fuselage illustrating the application of the adjustable supporting mechanism thereto, certain of the parts being broken away and shown in section for the sake of clarity;

Fig. 4 is a sectional view taken substantially as indicated by the line 4—4 of Fig. 3; and Fig. 5 is a detailed view taken as indicated by the line 5—5 of Fig. 3.

By reference, first, to Figs. 1 and 2, it will be seen that the aircraft illustrated includes a body or fuselage 2 at the forward end of which is arranged the propeller 3 which may be driven by any suitable motor means (not shown) and at the rear end of which the tail structure is supported, the said tail structure including a horizontally disposed aerofoil surface 4 and a vertically disposed surface 5 which are adapted to be adjusted in the usual manner to control, respectively, the attitude of the aircraft and the direction thereof, in flight.

Mounted on the supports 6 at a convenient distance above the fuselage is a set of sustaining blades 7, four being here shown. The mounting of the blades is such as to permit rotation thereof about a common axis by the action of the relative air-flow when the aircraft is in flight. The blades may be made flexible or may be flexibly or pivotally mounted in such manner as to permit them, independently, to assume various positions under the influence of lift, centrifugal, and other forces, as indicated at a, b.

If desired supplemental supporting or sustaining surfaces 8 may be provided at each side of the fuselage and may be employed to support the usual aileron or manually operable lateral stability control surfaces 9. Structural features of the rotary wing system herein shown only generally are fully disclosed and claimed in my copending application Serial No. 496,872, filed November 20, 1930. The combined arrangement of the rotary and fixed wings is fully disclosed and claimed in my copending application Serial No. 414,901, filed December 18, 1929.

The machine is also provided with an undercarriage 10 including wheels 11, preferably of the rubber inflated type, and shock absorbers 12. For reasons which will appear more fully hereinafter the undercarriage is preferably made of relatively great height as compared to the length of the fuselage 2.

Depending from the rear portion of the fuselage 2 I have provided an adjustable tail supporting or skid mechanism including an inflated wheel 13 which is rotatably mounted between the lower ends of the members 14, the upper ends thereof being pivotally connected to portions of the framework 15 of the fuselage as indicated at 16 in Figs. 3 and 4. A short distance above the wheel 13 I have arranged the pivot pin 17 extending between the members 14 and serving as the pivot point for the lower end of the supporting member or link 18 in which a shock absorber 19 is preferably provided. The other end of the member 18 extends upwardly into the fuselage and is pivotally connected at 20 to the collar or yoke 21 which is mounted for sliding movement along the shaft 22 extending fore and aft within the fuselage frame between the bracing members 23 and 24 to which its ends are secured. A controlling link 25 extending rearwardly from the lever 25a in the cockpit of the fuselage is operatively connected to the member 18 at the point of attachment thereof to the yoke 21 (see Figs. 3 and 4).

As will be apparent from inspection of Figs. 2 and 3, this tail supporting arrangement permits adjustment or movement of the wheel 13 upwardly and downwardly with respect to the ground G, the position of the various parts when the wheel 13 is in its retracted position, being indicated, in the figures just referred to, by the dotted line showing 26. The retracted position of the tail support is illustrated in full lines in Fig. 1, and in this connection it is to be observed that stop means 27 are provided on the fuselage to take the weight of the tail when the machine is at rest on the ground with the tail skid in its retracted position. This stop preferably comprises a rubber block which may be suitably supported at the underside of the frame of the fuselage with a suitable backing means 28 as a mounting therefor (see Fig. 5). In retracted position, wind resistance of the tail-supporting structure is also reduced to a minimum.

It is to be understood in connection with the construction of the aircraft, in general, that the undercarriage, the fuselage and the tail support are so relatively proportioned and arranged that, with the tail support in its extended position (full line showing in Fig. 2), the machine may be supported on the ground G with the disc defined by the sustaining blades 7, in rotation, at least approximating parallelism or at a slight incidence with respect to the ground. The undercarriage, fuselage and tail support, furthermore, are so arranged and proportioned that, with the tail support in its retracted position (see Fig. 1), the rotor disc extends at a very substantial inclination rearwardly and downwardly. This position of the aircraft also results in the positioning of the propeller 3 in such manner that the slip stream or back wash, or at least a portion thereof, is directed against the ground at a point, or within a zone, such that upon deflection by the ground, a large portion of the slip stream is caused to pass upwardly and rearwardly through the path of travel of the sustaining blades. In this manner, the slip stream of the propelling means may be employed for initiating movement of the rotor blades prior to taking off from the ground merely by utilizing the ground to deflect backwash or slip stream through the rotor blade disc.

In order to obtain the maximum possible deflection by the ground, the undercarriage 10 is preferably made of relatively great height, while the fuselage is preferable relatively short. A further advantage of the high undercarriage is that a long travel may be provided in the shock-absorbing means to take the thrust of vertical descent. In addition, the tail support is so arranged that it may be drawn up very close to the underside of the fuselage and thus permit support of the aircraft at the maximum possible inclination, for starting purposes.

In conclusion it is to be observed that, in addition to providing a convenient and effective method and apparatus for initially starting the rotor blades, the present invention provides for support of the aircraft on the ground in such manner that landings may safely be made vertically or at steep angles, even in a relatively strong wind, in view of the fact that the rotor disc may be so disposed as to its general angle of incidence, by extending the tail support, that the effect of the relative air-flow created by the wind would not increase the lift sufficiently to prevent the machine from landing or to cause it to rise or take off again.

I claim:

1. An aircraft including sustaining blades rotatably mounted for actuation by the relative air-flow in flight, propelling means and means for supporting the tail of the aircraft when on the ground including a member adapted to contact with the ground and movable to a plurality of positions vertically with respect to the aircraft, the body of the said aircraft, the sustaining blades and the supporting means being relatively arranged and proportioned so that, with the said member in a position adjacent the aircraft, at least a portion of the slip stream of the propelling means strikes the ground and is deflected thereby upwardly through the path of travel of the sustaining blades.

2. An aircraft including a fuselage, sustaining blades rotatably mounted above the fuselage for actuation by the relative air-flow in flight, propelling means, an undercarriage and a tail supporting device, the height of said undercarriage and of said device and the length of the fuselage being so relatively proportioned that, when the aircraft is on the ground, at least a portion of the slip stream of the propelling means strikes the ground at such point that upon deflection thereby it passes through the path of travel of the sustaining blades, together with means for altering the height of the said device.

3. An aircraft including a fuselage, sustaining blades rotatably mounted above the fuselage for actuation by the relative air-flow in flight, propelling means, an undercarriage and a tail supporting device, the height of said undercarriage and of said device and the length of the fuselage being so relatively proportioned that, when the aircraft is on the ground, at least a portion of the slip stream of the propelling means strikes the ground at such point that upon deflection thereby it passes through the path of travel of the sustaining blades, together with means for altering the height of the said device including a connection therefrom to a cockpit of the fuselage.

4. An aircraft including a fuselage, sustaining blades rotatably mounted above the fuselage for actuation by the relative air-flow in flight, propelling means, an undercarriage and a vertically adjustable tail supporting device, the adjustment of said device including a position in which the device and the undercarriage serve to support the fuselage in substantially horizontal position when the aircraft is on the ground.

5. An aircraft including a fuselage, sustaining blades rotatably mounted above the fuselage for actuation by the relative air-flow in flight, propelling means, an undercarriage and a vertically adjustable tail supporting device, the adjustment of said device including a position in which the device and the undercarriage serve to support the fuselage in substantially horizontal position when the aircraft is on the ground and a position in which the device and the undercarriage serve to support the fuselage at an angle such that at least a portion of the slip stream of the propelling means is directed against the ground at such point that upon deflection thereby it passes through the path of travel of the sustaining blades.

6. The method of operating an aircraft of the type having movable sustaining means actuable by relative air-flow, which includes creating an air-flow and utilizing the ground to effect a deflection thereof against said means to move the same.

7. The method of operating an aircraft of the type having propelling means and movable sustaining means actuable by relative air-flow, which includes utilizing the ground to effect a deflection of slip stream of the propelling means against the sustaining means to put the same in motion.

8. The method of operating an aircraft having movable sustaining means actuable by relative air-flow, which includes utilizing the ground to deflect air through the path of travel of the sustaining means to initiate movement thereof preparatory to taking off and utilizing the relative air-flow resulting from movement of the aircraft in flight to maintain the sustaining means in motion.

9. The method of operating an aircraft having forward propelling means and rotatably mounted sustaining blades actuable by relative air-flow, which includes starting the propelling means and utilizing the ground to deflect at least a portion of the slip stream thereof through the path of travel of the sustaining blades to initiate movement thereof.

10. The method of operating an aircraft having forward propelling means and rotatably mounted sustaining blades actuable by relative air-flow, which includes starting the propelling means, utilizing the ground to deflect at least a portion of the slip stream thereof through the path of travel of the sustaining blades to initiate movement thereof, and utilizing the relative air-flow resulting from movement of the aircraft in flight to maintain the sustaining blades in rotation.

In testimony whereof I have hereunto signed my name.

JUAN DE LA CIERVA.